June 27, 1933.  S. J. GREEN ET AL  1,915,573
MANUFACTURE OF ALIPHATIC ACID ANHYDRIDES
Filed Jan. 5, 1929
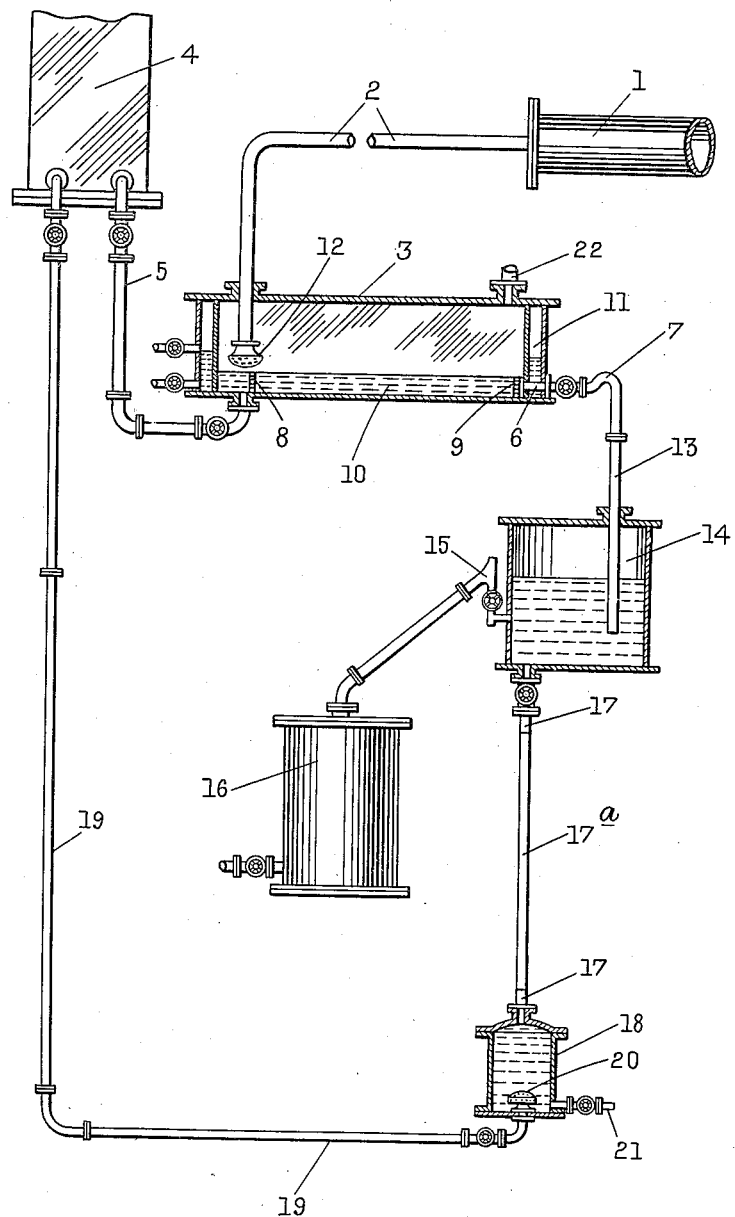
STANLEY J. GREEN
RONALD R. WIDDOWSON
INVENTORS
ATTORNEYS Patented June 27, 1933

1,915,573

UNITED STATES PATENT OFFICE

STANLEY JOSEPH GREEN AND RONALD RUMSEY WIDDOWSON, OF SPONDON, NEAR DERBY, ENGLAND, ASSIGNORS TO CELANESE CORPORATION OF AMERICA, A CORPORATION OF DELAWARE

MANUFACTURE OF ALIPHATIC ACID ANHYDRIDES

Application filed January 5, 1929, Serial No. 330,577, and in Great Britain January 28, 1928.

This invention relates to the manufacture of aliphatic anhydrides from aliphatic acids and especially to the manufacture of acetic anhydride from acetic acid.

It is well known that when the vapor of acetic or other aliphatic acid is subjected to the action of heat, especially in presence of catalysts or catalytic surfaces, the acid is split to its anhydride and water.

It has also been shown—see British Specifications Nos. 279,916, 303,772 and 298,667 and the United States specifications corresponding respectively thereto viz. Patent No. 1,735,959 issued November 19, 1929 and applications S. No. 284,566 filed June 11, 1928 and S. No. 285,613 filed June 15, 1928—that aliphatic acids are split into their anhydrides at relatively high or high temperatures to a very substantial degree but that if the hot reaction gases or vapors are subjected to simple condensation the anhydride is very largely hydrolyzed back to the aliphatic acid, and the said specifications describe means of separation of the anhydride which obviate or greatly reduce the hydrolysis of the anhydride.

The object of the present invention is to provide a certain process whereby this subsequent hydrolysis and loss of anhydride may be obviated or eliminated to a large extent.

According to the present invention we subject the vapors of aliphatic acids (and especially acetic acid) to thermal decomposition, in the known manner and subject the gases or vapors from the hot reaction zone to condensation by causing them to impinge upon a stream of a liquid (in which term we include a liquid mixture) which is a solvent for the anhydride and insoluble or substantially insoluble in water. The stream of the liquid or liquid mixture may be employed at any temperature below the boiling point of the anhydride and of the liquid or liquid mixture employed, but we prefer to employ the same at a low temperature for instance from 0° to about 25° C., or even lower temperatures such for instance as −10° C., but the temperature to be employed will of course not be below the melting point of the liquid employed. By such means a rapid condensation of the reaction gases or vapors is effected and the anhydride effectively separated from the water.

The anhydride may be recovered from the liquid or liquid mixture in any suitable way, for instance, the liquid or liquid mixture may be collected in a suitable vessel and the water layer (usually the lower layer) which separates therefrom be removed, and the other layer (usually the top layer) be subjected to fractional distillation to recover the anhydride.

Or, if desired, the liquid or liquid mixture may be collected in any suitable form of continuous separator whereby the water layer and the solvent layer may be separated continuously. For instance, the liquid mixture may be collected in a vessel provided with a constant level run off, in which case the upper layer (usually the layer of solvent charged with the anhydride) may be continuously run off. Or for instance the liquid or liquid mixture may be collected in a vessel provided with a continuous run off at or near the bottom thereof, in which case the lower layer (usually the water layer) may be continuously run off. Or, for instance, a vessel having both a constant level run off and a continuous run off at or near the bottom thereof may be employed, in which case both upper and lower layers may be continuously run off. In cases where the vessel is provide at or near the bottom thereof with a continuous run off, such run off may conveniently take the form of a pipe connected to the bottom of the vessel (or to a side of the vessel near the bottom thereof) and extending upwards to a convenient level below that at which it is desired to maintain the fluid in the vessel.

For the purpose of the present invention we may employ any liquid or liquid mixture which is a solvent for the anhydride and which is insoluble or substantially insoluble in water. For instance, we may employ benzene, mixtures of ethyl ether or chloroform with one or more hydrocarbons such as paraffins (particularly the petroleum fraction of boiling point 40° to 70° C.

termed petroleum ether), gasoline or petrol (preferably that portion boiling between 70° and 90° C.), kerosene, benzene, or homologues of benzene, or benzol. The following in particular have been found especially suitable:—ether in admixture with petroleum ether (especially mixtures containing about 30% to 50% of petroleum ether), chloroform in admixture with petroleum ether and/or gasoline.

The aliphatic acid vapors may be subjected to the action of the necessary heat in any known manner, in presence or absence of catalysts. For instance the aliphatic acid vapor may be passed through tubes (or other reaction vessels) made of copper, fireclay, fused silica, heated to the desired temperature, for instance, about 400° to 1000° C. and preferably 600° to 800° C.

By performing the reaction (i. e. the thermal decomposition of the aliphatic acid vapor) under reduced pressure or "vacuum" and/or by diluting the aliphatic acid vapor with indifferent gases (for instance, nitrogen, carbon dioxide) decomposition to gaseous products may often be avoided and higher efficiency obtained. It will be understood however that we do not limit ourselves in regard to the pressure to be employed for the reaction.

It will be understood that the invention is not limited as to the strength of aliphatic acid employed. The process can be performed even with the vapors of dilute acids; and besides affording a ready means for the manufacture of anhydrides from concentrated or highly concentrated acids, it affords valuable means for producing anhydrides from waste or dilute acids, especially waste or dilute acetic acids such as result from the acetylation of cellulose or other industrial acetylation processes.

The accompanying drawing illustrates in diagrammatic form one form of execution of the invention supposed as applied by way of example for the production of acetic anhydride from glacial or concentrated acetic acid, it being understood that this form is given only by way of illustration and is in no way limitative.

In the form shown the reaction vapors are subjected to condensation by causing them to impinge upon a stream of a mixture of ether and petroleum ether (for instance, a mixture of equal volumes of ether and petroleum ether); for convenience this mixture is hereinafter referred to as the "separating" liquid.

Referring to the drawing, the hot reaction vapors, produced by thermally decomposing the vapor of glacial or concentrated acetic acid vapor in any known manner, pass from the hot reaction zone 1 via the pipe 2 to the condensation vessel 3. The separating liquid passes from the supply tank 4 via the pipe 5 to the condensation vessel 3, across which vessel the mixture flows in a rapid stream to the outlet pipe 6, which pipe is provided with a constant level overflow 7 serving to maintain a substantially constant level in the vessel 3. Perforated baffles 8 and 9 are provided in the vessel 3 to ensure even flow of the separating liquid 10 across the vessel 3. The vessel 3 is cooled by the circulation of cold water or brine through the jacket 11 in such manner as to keep the separating liquid 10 in the vessel 3 at a temperature below about 20° C. The reaction vapors leave the pipe 2 through the nozzle 12 which causes them to impinge in fine streams on to the stream of the separating liquid 10 in the vessel 3. The reaction vapors are condensed on coming into contact with the stream of separating liquid, and the anhydride is separated from the water to a very efficient extent, the anhydride (together with unconverted acetic acid) dissolving in the separating liquid whilst the water is condensed and separated. The separating liquid, together with the dissolved anhydride and separated water passes via the constant level overflow 7 and pipe 13 to the vessel 14 wherein the liquid separates into two layers, the water forming the lower layer whilst the separating liquid and the dissolved anhydride (and unconverted acetic acid) form the upper layer. The upper layer passes continuously from the vessel 14 via the pipe 15 to the collecting vessel 16, from whence it may be withdrawn and heated in any appropriate apparatus to distil off the ether and petroleum ether from the anhydride. The lower layer (consisting substantially of water) passes continuously from the vessel 14 via the pipe 17 to the run off vessel 18, and in so doing is scrubbed by an ascending stream of the separating liquid fed by gravity from the supply tank 4 via the pipe 19 and nozzle 20. The separating liquid issues from the nozzle 20 in the form of fine spray and passes up the pipe 17 into the vessel 14; for convenience of observation the section 17a of the pipe 17 is made of glass. By means of this scrubbing very little anhydride or unconverted acetic acid is carried away by the water and the water can be run off to waste from the run off vessel 18 by means of the cock 21. Any air or other uncondensable gases in the reaction vapors may be allowed to escape from the vessel 3 via the pipe 22, and, if desired, any gas so escaping may be treated in any suitable manner to condense and recover any vapors carried over.

What we claim and desire to secure by Letters Patent is:—

1. In a process for the manufacture of an aliphatic anhydride by thermal decomposition of an aliphatic acid, the step of subjecting the vapors from the thermal decomposition to condensation by causing them to impinge upon a stream of a liquid which is an inert solvent for the anhydride and substantially insoluble in water, the stream of liquid being employed at temperatures below the boiling point of the anhydride.

2. In a process for the manufacture of acetic anhydride by thermal decomposition of acetic acid the step of subjecting the vapors from the thermal decomposition to condensation by causing them to impinge upon a stream of a liquid which is an inert solvent for the anhydride and substantially insoluble in water, the stream of liquid being employed at temperatures below the boiling point of the anhydride.

3. In a process for the manufacture of an aliphatic anhydride by thermal decomposition of an aliphatic acid, the step of subjecting the vapors from the thermal decomposition to condensation by causing them to impinge upon a stream of a liquid which is an inert solvent for the anhydride and substantially insoluble in water, the stream of liquid being employed at a temperature between $-10°$ C. and $25°$ C.

4. In a process for the manufacture of an aliphatic anhydride by thermal decomposition of an aliphatic acid, the step of subjecting the vapors from the thermal decomposition to condensation by causing them to impinge upon a stream of a mixture of ether and petroleum ether maintained at a temperature between $-10°$ C. and $25°$ C.

5. In a process for the manufacture of acetic anhydride by thermal decomposition of acetic acid, the step of subjecting the vapors from the thermal decomposition to condensation by causing them to impinge upon a stream of a mixture of ether and petroleum ether maintained at a temperature between $-10°$ C. and $25°$ C.

6. In a process according to claim 1, the further steps of collecting the liquid stream in a vessel, allowing the liquid to separate into two layers (respectively a solvent layer containing the anhydride and a layer consisting substantially of water) and removing the solvent layer.

7. In a process according to claim 1, the further steps of continuously collecting the liquid stream in a continuous separator, allowing the collected liquid to separate into two layers (respectively the solvent layer containing the anhydride and a layer consisting substantially of water), and continuously removing the solvent layer from said separator.

In testimony whereof, we have hereunto subscribed our names.

STANLEY JOSEPH GREEN.
RONALD RUMSEY WIDDOWSON.